(12) United States Patent
Zhang et al.

(10) Patent No.: US 11,269,384 B2
(45) Date of Patent: Mar. 8, 2022

(54) CURVED SURFACE ADJUSTMENT DEVICE AND LED DISPLAY SCREEN

(71) Applicant: SHENZHEN GLOSHINE TECHNOLOGY CO., LTD., Guangdong (CN)

(72) Inventors: Yongjun Zhang, Guangdong (CN); Guoqiang Li, Guangdong (CN); Yongfeng Guo, Guangdong (CN)

(73) Assignee: SHENZHEN GLOSHINE TECHNOLOGY CO., LTD., Shenzhen (CN)

( * ) Notice: Subject to any disclaimer, the term of this patent is extended or adjusted under 35 U.S.C. 154(b) by 387 days.

(21) Appl. No.: 16/476,547

(22) PCT Filed: Nov. 9, 2018

(86) PCT No.: PCT/CN2018/114796
§ 371 (c)(1),
(2) Date: Jul. 8, 2019

(87) PCT Pub. No.: WO2020/037844
PCT Pub. Date: Feb. 27, 2020

(65) Prior Publication Data
US 2021/0263568 A1    Aug. 26, 2021

(30) Foreign Application Priority Data
Aug. 21, 2018   (CN) .......................... 201810955925.X

(51) Int. Cl.
*F16M 11/00*   (2006.01)
*G06F 1/18*    (2006.01)
(Continued)

(52) U.S. Cl.
CPC ............. *G06F 1/181* (2013.01); *F16M 11/08* (2013.01); *G09F 9/301* (2013.01); *F16M 2200/024* (2013.01)

(58) Field of Classification Search
CPC .... G06F 1/181; F16M 11/08; F16M 2200/02; G09F 9/301
See application file for complete search history.

(56) References Cited

U.S. PATENT DOCUMENTS

| 9,377,153 B2 * | 6/2016 | Zhang ................... F16M 11/42 |
| 2007/0221807 A1 * | 9/2007 | Park ................... F16M 11/2092 248/324 |
| 2015/0246681 A1 * | 9/2015 | Raper, Jr. ................. B66F 5/02 254/4 R |

FOREIGN PATENT DOCUMENTS

| CN | 207381024 U | 5/2018 |
| CN | 207517295 U | 6/2018 |

OTHER PUBLICATIONS

CN 207381024U published on May 18, 2018 English Translation (Year: 2018).*

* cited by examiner

*Primary Examiner* — Pete T Lee

(57) ABSTRACT

Provided is a curved surface adjustment device comprising an angle rotating assembly and a locking assembly, wherein the angle rotating assembly comprises a middle plate and a housing, the housing comprises a first mounting portion and a receptacle, the middle plate comprises a second mounting portion and an arc-shaped sliding portion; the locking assembly comprises a locking mechanism, when the locking mechanism is in a locking state, the arc-shaped sliding portion is locked in the arc-shaped sliding groove of the receptacle, when in an unlocking state, the arc-shaped sliding portion slides relative to the arc-shaped sliding (Continued)

groove of the receptacle, to adjust the included angle between the first mounting portion and the second mounting portion, thereby adjusting the curved surface radian of the LED display screen. The LED display screen adjusted by the present invention has better curved surface smoothness and smaller curved surface radius, provides more excellent display effect.

12 Claims, 13 Drawing Sheets

(51) Int. Cl.
*F16M 11/08* (2006.01)
*G09F 9/30* (2006.01)

CURVED SURFACE ADJUSTMENT DEVICE AND LED DISPLAY SCREEN

TECHNICAL FIELD OF THE INVENTION

The invention belongs to the technical field of curved surface adjustment of LED display screens, and relates to a curved surface adjustment device and LED display screen.

BACKGROUND OF THE INVENTION

In the prior art, LED display screen generally realizes the curved display of the screen body through the trimming of the display screen box body and arcuate lock. However, the above methods require customization of a specific steel frame structure, which is large in work quantity and high in cost. Different steel structures need to be customized for different radii of curved surfaces, which has poor universality, poor surface smoothness, large curved surface radius and unsatisfactory curved display effect.

SUMMARY OF THE INVENTION

The technical problem to be solved by the invention is to provide a curved surface adjustment device and an LED display screen aiming at the existing technical problem of poor surface smoothness of the screen body.

In order to solve the above technical problems, in one aspect, the embodiment of the present invention provides a curved surface adjustment device, comprising: an angle rotating assembly and a locking assembly, wherein the angle rotating assembly comprises a middle plate and a housing; the housing comprises a first mounting portion and a receptacle; an arc-shaped sliding groove is formed in the receptacle; the middle plate comprises a second mounting portion and an arc-shaped sliding portion; the second mounting portion is positioned outside the arc-shaped sliding groove; the arc-shaped sliding portion is positioned in arc-shaped sliding groove; and the first mounting portion and the second mounting portion are positioned at two sides of the arc-shaped sliding groove;

The locking assembly includes a locking mechanism having a locking state and an unlocking state, when the locking mechanism is in a locking state, the arc-shaped sliding portion is locked in the arc-shaped sliding groove, and when the locking mechanism is in an unlocking state, the arc-shaped sliding portion can slide relative to the arc-shaped sliding groove, so as to adjust the included angle between the first mounting portion and the second mounting portion. According to the curved surface adjustment device of the embodiment of the present invention, the housing includes a first mounting portion and a receptacle, the middle plate includes a second mounting portion and an arc-shaped sliding portion, which is located in the arc-shaped sliding groove of the receptacle. The first mounting portion is fixedly connected to the box frame of the LED display screen, and the second mounting portion is fixedly connected to the power control box of the LED display screen. When the locking mechanism is in an unlocking state, the arc-shaped sliding portion can slide relative to the arc-shaped sliding groove to adjust the included angle between the first mounting portion and the second mounting portion, so as to adjust the curved surface radian of LED display screen, after the curved surface radian of LED display screen is adjusted, the locking mechanism is switched to the locking state, then the arc-shaped sliding portion will be locked in the arc-shaped sliding groove, so that the curved surface radian of LED display screen will be fixed. The LED display screen adjusted by the curved surface adjustment device of the embodiment of the present invention has better surface smoothness and smaller curved surface radius, and provides more excellent display effect. Moreover, the curved surface adjustment device has the characteristics of reliable structure, high stability, more convenient adjustment, ect.

Optionally, the receptacle comprises a cover plate and a bottom plate, the arc-shaped sliding groove is arranged on the bottom plate, and the cover plate is fixedly connected to the bottom plate and covers the arc-shaped sliding groove.

Optionally, the locking mechanism comprises a thread component, a top bar, a bushing and a locking piece, and the bushing is fixedly connected to the bottom plate. The bushing is provided with a through hole extending along the axial direction of the bushing, the bottom plate is provided with a locking hole axially penetrating the through hole, and the locking piece is positioned in the locking hole;

The top bar is slidably connected in the through hole, one end of the top bar is provided with a threaded hole, one end of the thread component is threadedly connected in the threaded hole, and the other end of the top bar is abutted against the locking piece. Rotating the thread component can slide the top bar along the through hole, so that the locking piece locks the arc-shaped sliding portion.

Optionally, the locking piece comprises a locking plate and a locking shaft fixed on the locking plate, the locking shaft is provided with a positioning pin, the middle plate is provided with a plurality of locking grooves which can limit the positioning pin, and rotating the thread component can make the positioning pin locked in the corresponding locking groove.

Optionally, the locking mechanism further comprises a spring, and the spring is sleeved on the locking shaft and supported between the locking plate and the bottom plate.

Optionally, the thread component comprises a thread portion, a fixed portion, and a stop collar located between the thread portion and the fixed portion. The thread portion is threadedly connected in the threaded hole, and an annular rotation slot is formed around the outer circumference of the stop collar;

The locking mechanism further includes a detent, the detent passes through the bushing and snaps into the rotation slot;

The locking assembly further comprises a rotating rod, one end of the rotating rod is fixedly connected with the fixed portion, and the thread component can be rotated by rotating the rotating rod.

Optionally, the locking assembly further comprises a rotation stop ring, the rotation stop ring is sleeved on the bushing, the inner sidewall of the rotation stop ring is provided with a rotation stop slot, and one end of the rotation stop ring is provided with a rotation stop hole;

The bushing is provided with a first rotation stop block, the first rotation stop block is slidably connected in the rotation stop slot, and one end of the rotating rod is provided with a second rotation stop block corresponding to the position of the rotation stop hole;

The rotation stop ring is provided with a rotation stop position and a rotatable position, and in the rotation stop position of the rotation stop ring, the second rotation stop block is positioned in the rotation stop hole; In the rotatable position of the rotation stop ring, the second rotation stop block is away from the rotation stop hole.

Optionally, the curved surface adjustment device comprises two angle rotating assemblies, and the locking assembly comprises two locking mechanisms. The two angle rotating assemblies are symmetrically arranged at both ends of the rotating rod, the two locking mechanisms are symmetrically connected at both ends of the rotating rod and are respectively positioned between the angle rotating assembly and the rotating rod, and rotating the rotating rod can make the two locking mechanisms synchronously switch between locking state and unlocking state.

Optionally, the middle plate is provided with an angle identification and a marble, and the bottom plate is provided with an identification hole at a position corresponding to the angle identification.

Optionally, the middle plate is provided with a guide arc hole, the bottom plate is provided with a guide post, the radians of the guide arc hole and the arc-shaped sliding groove are the same and the centers of the circles coincide, and the guide post is positioned in the guide arc hole.

In another aspect, the embodiment of the present invention provides an LED display screen, comprising an LED module, a power control box, a box frame and a curved surface adjustment device, wherein the power control box is fixedly connected to the LED module, the box frame is fixedly connected to the edge of the LED module, the central axis of the power control box is parallel to the box frame, the first mounting portion is fixedly connected to the box frame, and the second mounting portion is fixedly connected to the power control box.

Optionally, the LED display screen comprises two curved surface adjustment devices and two box frames, the power control box is positioned in the center of the LED module. The two box frames are symmetrically and fixedly connected at two sides of the power control box, and the two curved surface adjustment devices are symmetrically arranged on two sides of the power control box.

Figure 1:
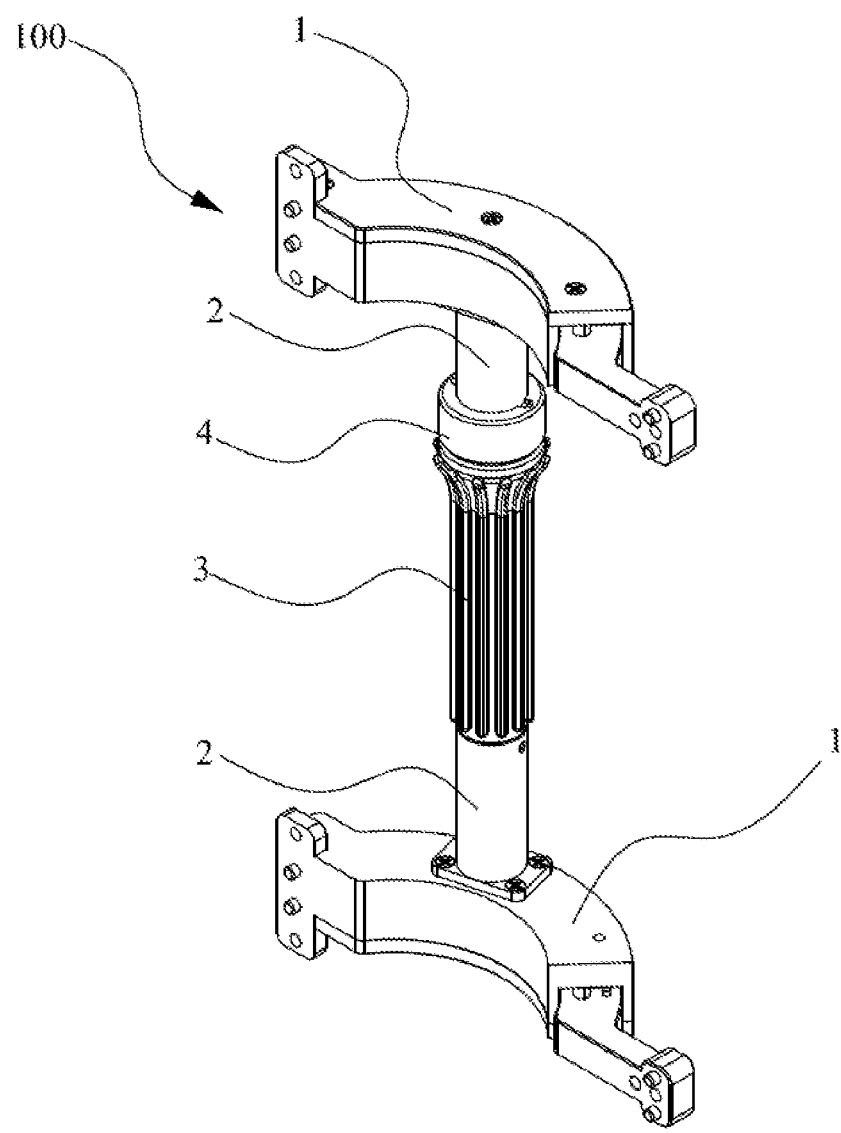
FIG. 1 is an isometric view of the curved surface adjustment device provided by an embodiment of the present invention.

Reference numbers in the specification are as follows:
100. Curved surface adjustment device;
1. Angle rotating assembly; 11. Middle plate; 111. Second mounting portion; 112. Arc-shaped sliding portion; 113. Locking groove; 114. Angle identification; 115. Marble slot; 116. Guide arc hole; 12. Housing; 120. Receptacle; 121. First mounting portion; 122. Cover plate; 123. Bottom plate; 1231. Arc-shaped sliding groove; 1232. Locking hole; 1233. Identification hole; 1234. Guide post; 1235. Marble screw; 13. Locking piece; 131. Locking plate; 132. Locking shaft; 133. Positioning pin;
2. Locking mechanism; 21. Thread component; 211. Thread portion; 212. Fixed portion; 213. Stop collar; 2131. Rotation slot; 22. Top bar; 221. Threaded hole; 222. Anti-rotation slot; 23. Bushing; 231. Through hole; 232. First rotation stop block; 25. Spring; 26. Detent; 27. Anti-rotation screw;
3. Rotating rod; 31. Second rotation stop block; 32. Clamping hole; 4. Rotation stop ring; 41. Rotation stop slot;
200. LED module;
300. Power control box;
400. Box frame.

DETAILED DESCRIPTION OF THE EMBODIMENT

In order to make the technical problem to be solved, technical solutions and beneficial effects of this application more clearly understood, the application will be described in further detail below with reference to the drawings and embodiments. It should be understood that the specific embodiments described herein are only for the purpose of illustration and are not intended to limit the scope of the application.

As shown in FIGS. 1 to 16, the LED display screen provided by the embodiment of the present invention includes an LED module 200, a power control box 300, a box frame 400, and a curved surface adjustment device 100. The power control box 300 is fixedly connected to the LED module 200, the box frame 400 is fixedly connected to the edge of the LED module 200, and the central axis of the power control box 300 is parallel to the box frame 400.

As shown in FIGS. 1 to 11, the curved surface adjustment device 100 provided by the embodiment of the present invention includes an angle rotating assembly 1 and a locking assembly, wherein the angle rotating assembly 1 includes a middle plate 11 and a housing 12. The housing 12 includes a first mounting portion 121 and a receptacle 120, and an arc-shaped sliding groove 1231 is formed inside the receptacle 120. The middle plate 11 comprises a second mounting portion 111 and an arc-shaped sliding portion 112; the second mounting portion 111 is positioned outside the arc-shaped sliding groove 1231; the arc-shaped sliding portion 112 is positioned in arc-shaped sliding groove 1231; and the first mounting portion 121 and the second mounting portion 111 are positioned at two sides of the arc-shaped sliding groove 1231. The first mounting portion 121 is fixedly connected to the box frame 400, and the second mounting portion 111 is fixedly connected to the power control box 300.

The locking assembly includes a locking mechanism 2 having a locking state and an unlocking state, when the locking mechanism 2 is in a locking state, the arc-shaped sliding portion 112 is locked in the arc-shaped sliding groove 1231, and when the locking mechanism is in an unlocking state, the arc-shaped sliding portion 112 can slide relative to the arc-shaped sliding groove 1231, so as to adjust the included angle between the first mounting portion 121 and the second mounting portion 111.

The first mounting portion 121 is provided with a first mounting hole and the second mounting portion 111 is provided with a second mounting hole. The included angle between the first mounting portion 121 and the second mounting portion 111 refers to the included angle between the central axis of the first mounting hole and the central axis of the second mounting hole.

According to the curved surface adjustment device 100 and the LED display screen provided by the embodiment of the invention, the housing 12 comprises a first mounting portion 121 and a receptacle 120. The middle plate 11 includes a second mounting portion 111 and an arc-shaped sliding portion 112 positioned in the arc-shaped sliding groove 1231 of the receptacle 120. The first mounting portion 121 is fixedly connected to the box frame 400, and the second mounting portion 111 is fixedly connected to the power control box 300. When the locking mechanism 2 is in an unlocking state, the arc-shaped sliding portion 112 can slide relative to the arc-shaped sliding groove 1231 to adjust the included angle between the first mounting portion 121 and the second mounting portion 111, so as to adjust the curved surface radian of LED display screen, after the curved surface radian of LED display screen is adjusted, the locking mechanism 2 is switched to the locking state, then the arc-shaped sliding portion 112 will be locked in the arc-shaped sliding groove 1231, so that the curved surface radian of LED display screen will be fixed. The LED display screen adjusted by the curved surface adjustment device 100 of the embodiment of the present invention has better surface smoothness and smaller curved surface radius, and provides more excellent display effect. Moreover, the curved surface adjustment device 100 has the characteristics of reliable structure, high stability, more convenient adjustment, ect.

Figure 14:
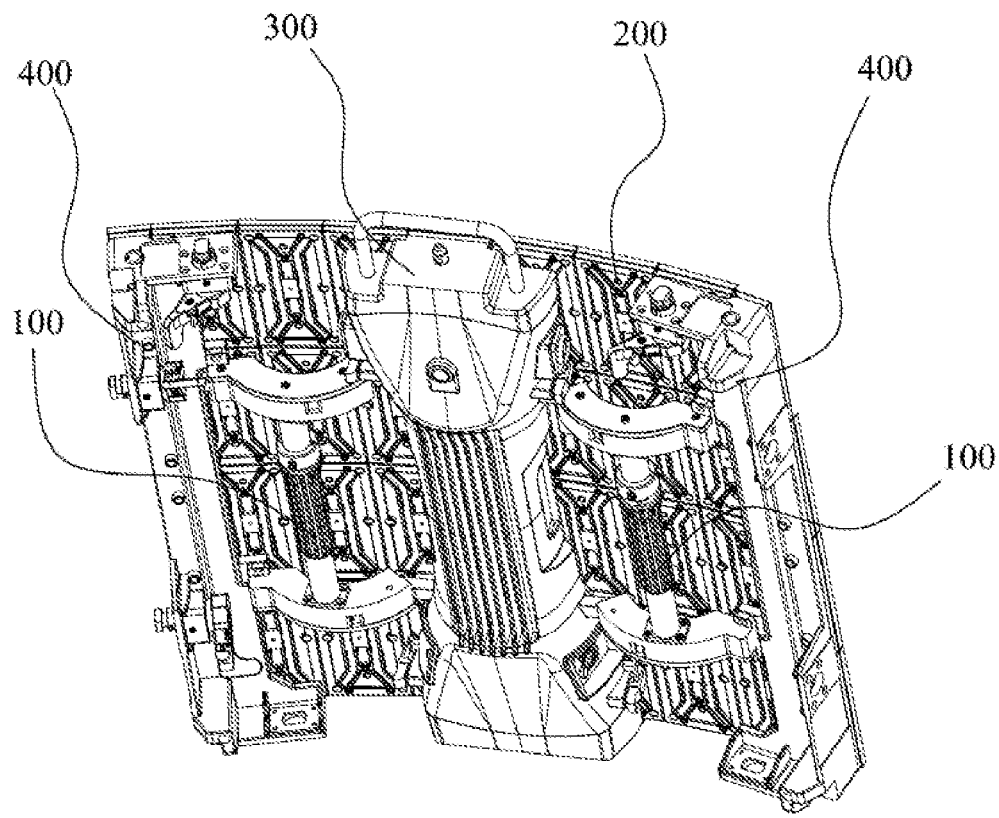
FIG. 14 is a schematic diagram of the LED display screen when the distance between the first mounting portion and the second mounting portion decreases according to an embodiment of the present invention.
Figure 15:
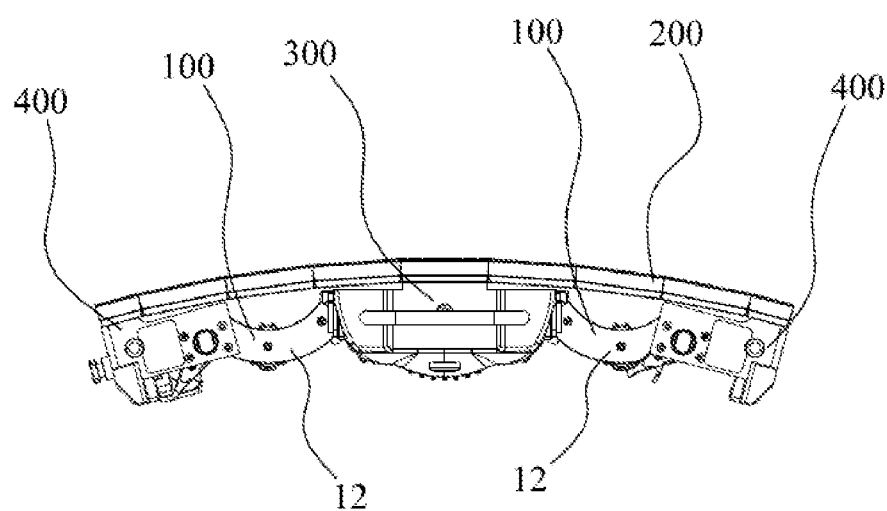
FIG. 15 is a schematic diagram of another view of the LED display screen when the distance between the first mounting portion and the second mounting portion decreases according to an embodiment of the present invention.
Figure 16:
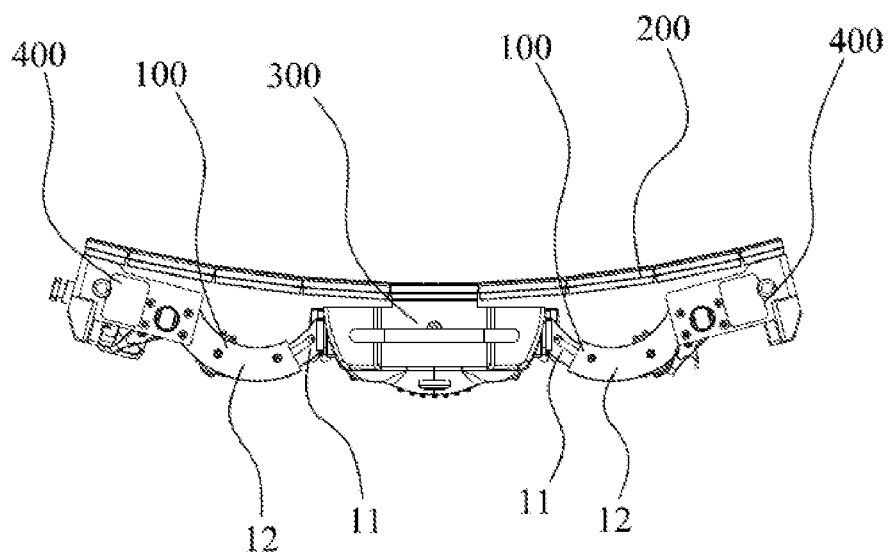
FIG. 16 is a schematic diagram of the LED display screen when the distance between the first mounting portion and the second mounting portion increases according to an embodiment of the present invention.

After the curved surface adjustment device 100 is installed between the box frame 400 and the power control box 300, assuming that the led display screen is planar in the initial state, and the included angle between the first mounting portion 121 and the second mounting portion 111 is the initial angle (the scale mark corresponding to the initial angle is 0). When the angle between the first mounting portion 121 and the second mounting portion 111 is adjusted to a positive scale value, the curved surface of the LED display screen is convex (as shown in FIGS. 14 and 15). When the angle between the first mounting portion 121 and the second mounting portion 111 is adjusted to a negative scale value, the curved surface of the LED display screen is concave (as shown in FIG. 16).

In one embodiment, as shown in FIGS. 12 to 16, the LED display screen includes two curved surface adjustment devices 100 and two box frames 400, and the power control box 300 is located in the center of the LED module 200. The two box frames 400 are symmetrically and fixedly connected on both sides of the power control box 300, and the two curved surface adjustment devices 100 are symmetrically arranged on both sides of the power control box 300.

The curved surface adjustment devices 100 are symmetrically arranged on the LED module 200, so that users can adjust the curved surface radians of both sides of the LED module 200 respectively by adjusting the curved surface adjustment devices 100 on both sides of the power control box 300. The force point is divided into two, which reduces the possibility of damage to the LED module 200 caused by excessive stress when adjusting the curved surface.

Figure 2:
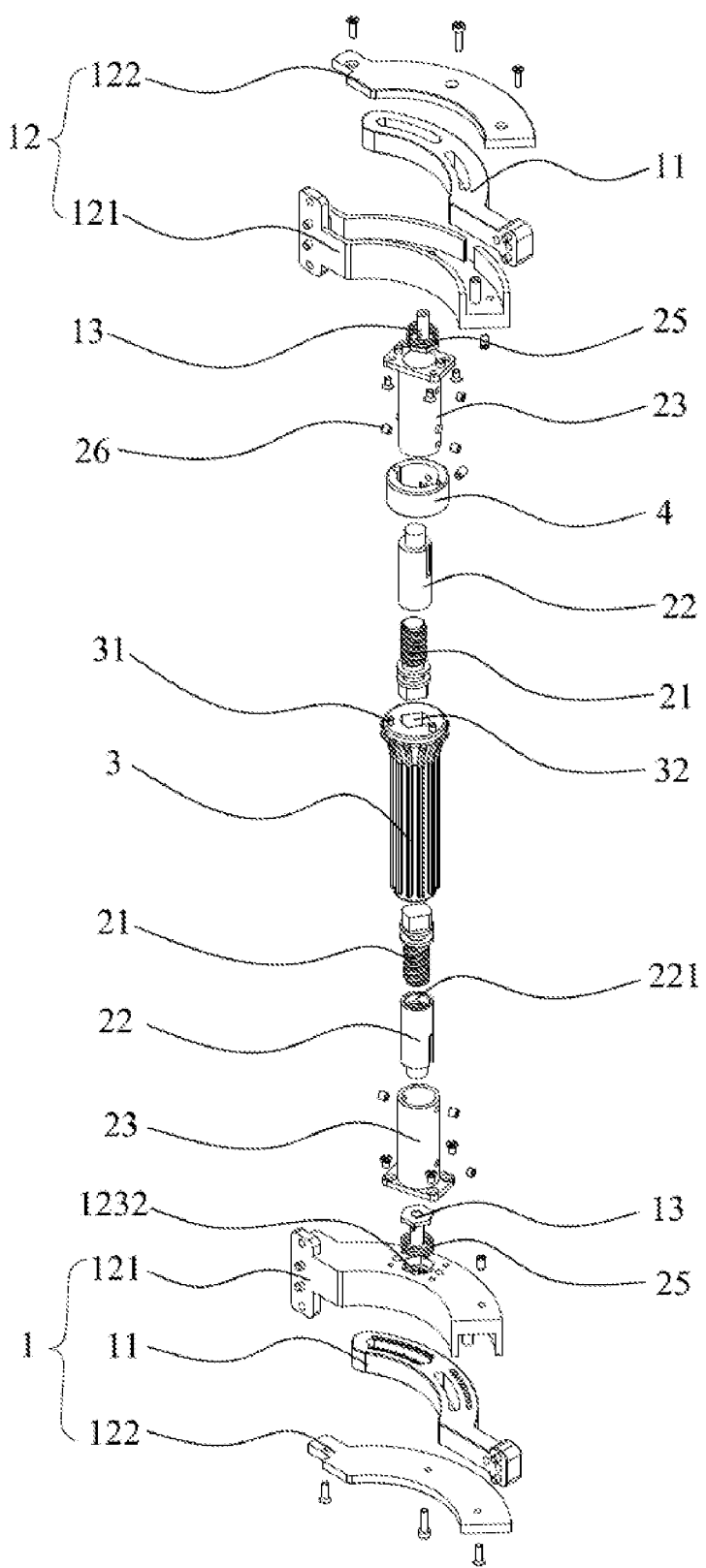
FIG. 2 is an exploded view of the curved surface adjustment device provided by an embodiment of the present invention.
Figure 3:
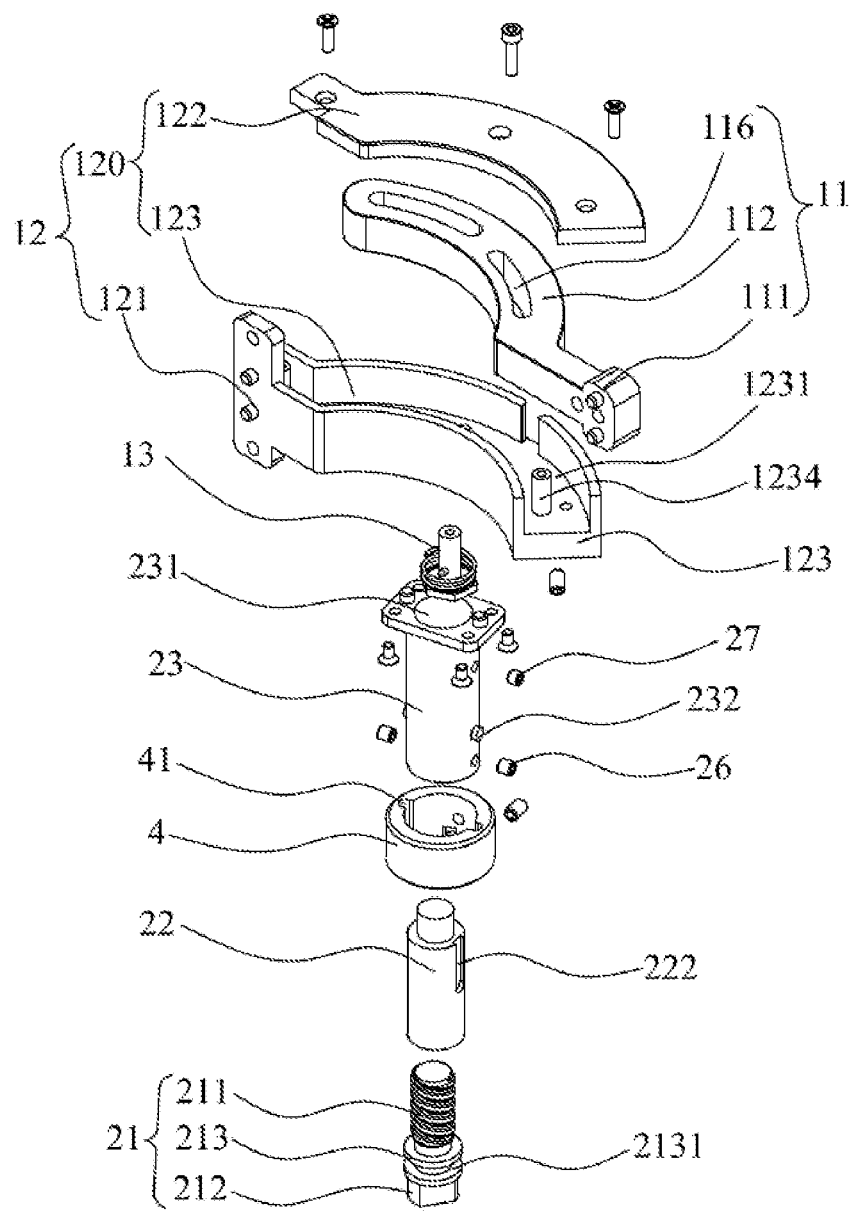
FIG. 3 is a partially exploded view of the curved surface adjustment device provided by an embodiment of the present invention.

In one embodiment, as shown in FIGS. 1 to 3, the receptacle 120 includes a cover plate 122 and a bottom plate 123, and the arc-shaped sliding groove 1231 is disposed on the bottom plate 123. The cover plate 122 is fixedly connected to the bottom plate 123 and covers the arc-shaped sliding groove 1231, so that the arc-shaped sliding portion 112 is located in the arc-shaped sliding groove 1231, and preventing the arc-shaped sliding portion 112 from falling out of the arc-shaped sliding groove 1231.

In one embodiment, as shown in FIGS. 1 to 3, the locking mechanism 2 includes a thread component 21, a top bar 22, a bushing 23 and a locking piece 13, and the bushing 23 is fixedly connected to the bottom plate 123. The bushing 23 is provided with a through hole 231 extending along the axial direction of the bushing 23, the bottom plate 123 is provided with a locking hole 1232 axially penetrating the through hole 231, and the locking piece 13 is positioned in the locking hole 1232.

The top bar 22 is slidably connected in the through hole 231, one end of the top bar 22 is provided with a threaded hole 221, the outer sidewall of the top bar 22 is provided with an anti-rotation slot 222, and the inner sidewall of the bushing 23 is provided with an anti-rotation screw 27, the anti-rotation slot 222 is in sliding contact with the anti-rotation screw 27, with the restriction of the anti-rotation screw 27, the top bar 22 can only slide along the through hole 231 of the bushing 23 and cannot rotate. One end of the thread component 21 is threadedly connected in the threaded hole 221, and the other end of the top bar 22 is abutted against the locking piece 13. Rotating the thread component 21 can slide the top bar 22 along the through hole 231, so that the locking piece 13 locks the arc-shaped sliding portion 112, making the arc-shaped sliding portion 112 locked in the arc-shaped sliding groove 1231, the included angle between the first mounting portion 121 and the second mounting portion 111 is relatively fixed.

Figure 4:
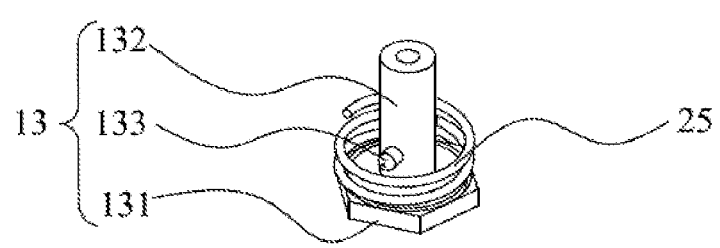
FIG. 4 is a schematic diagram of the curved surface adjustment device provided by an embodiment of the present invention.
Figure 5:
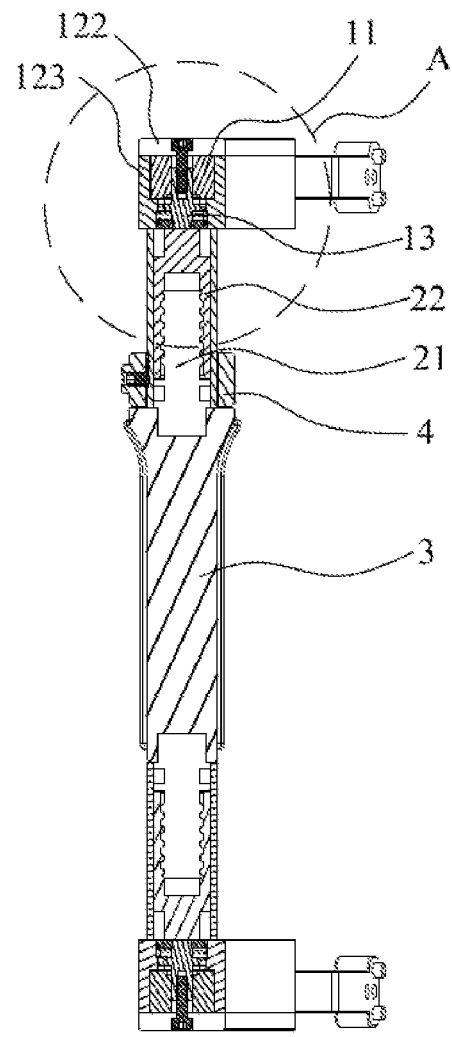
FIG. 5 is a sectional view of the locking mechanism of the curved surface adjustment device in an unlocking state according to an embodiment of the present invention.
Figure 6:
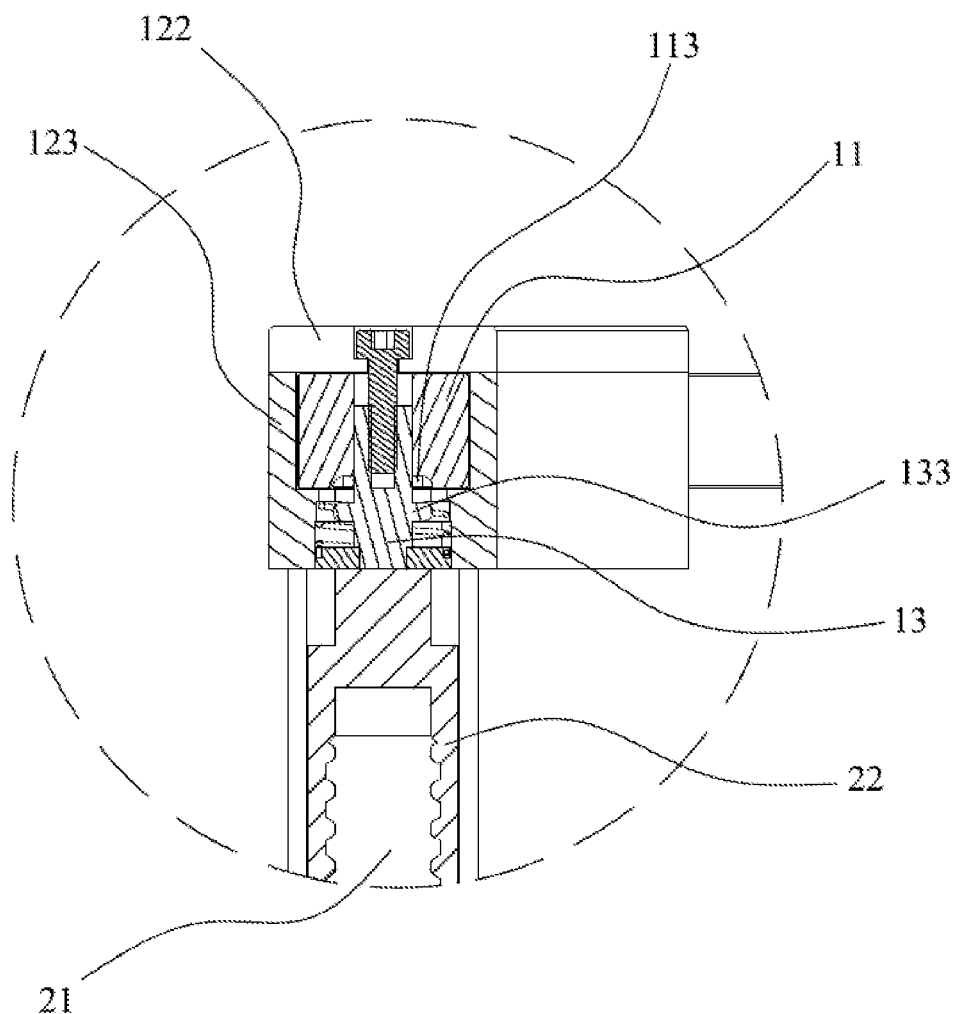
FIG. 6 is an enlarged view of A of FIG. 5.
Figure 7:
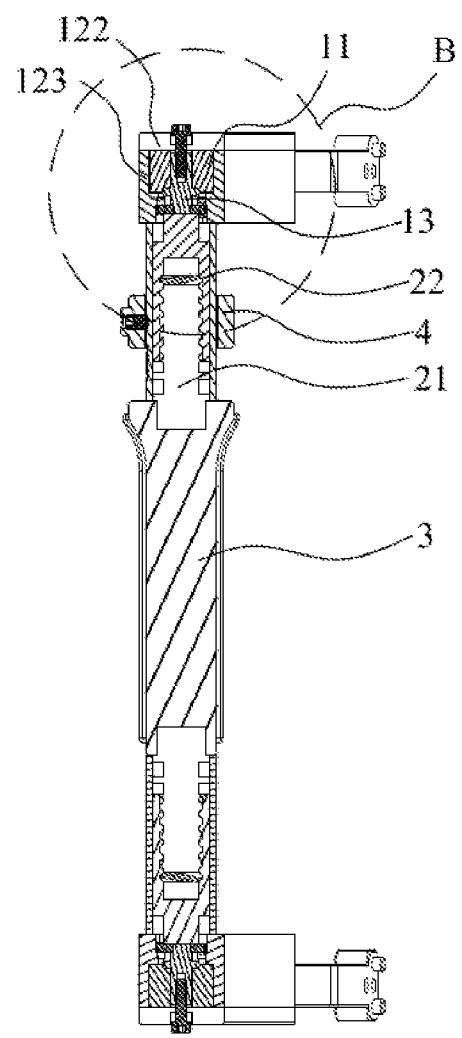
FIG. 7 is a sectional view of the locking mechanism of the curved surface adjustment device in a locking state according to an embodiment of the present invention.
Figure 8:
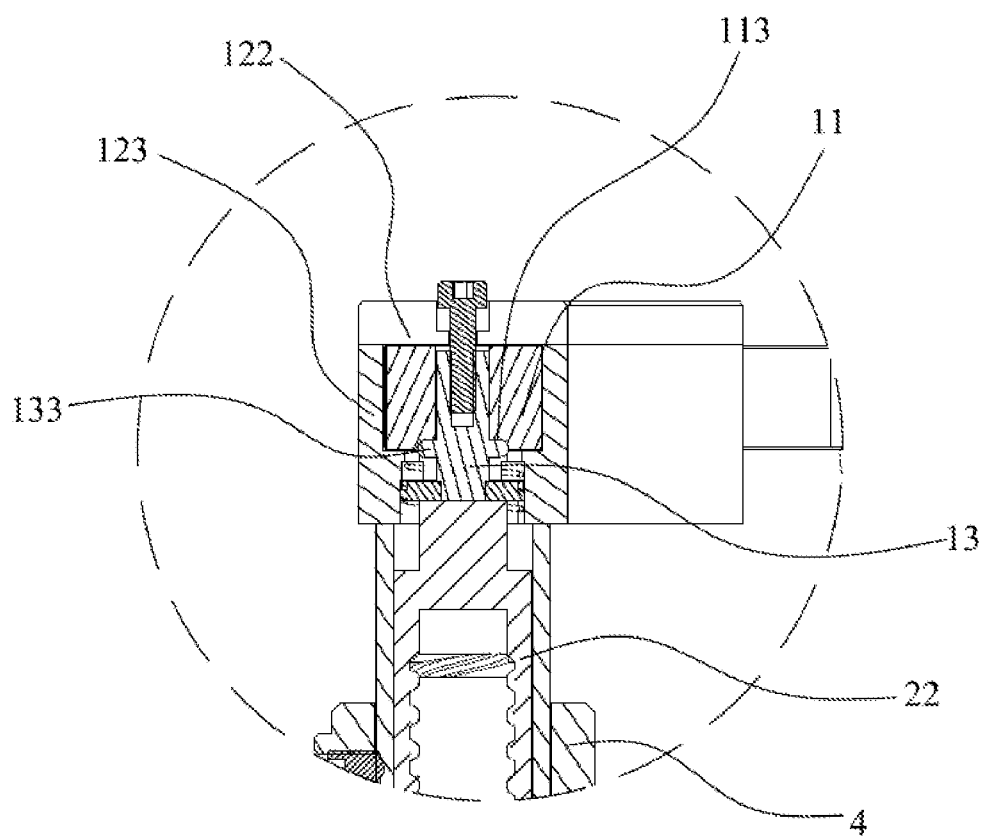
FIG. 8 is an enlarged view of B in FIG. 7.
Figure 11:
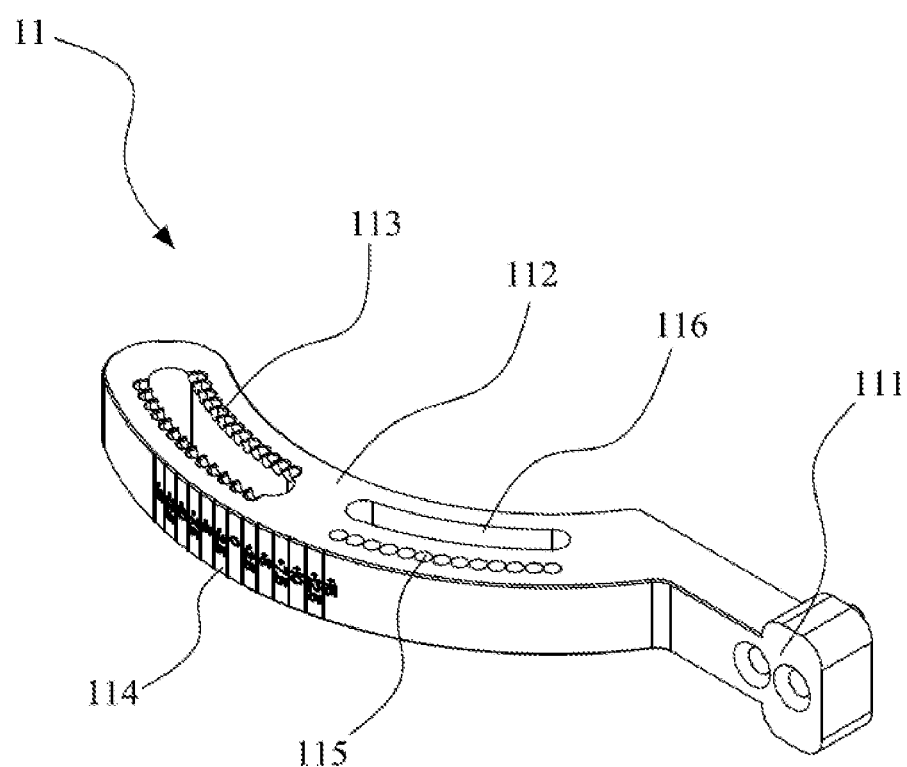
FIG. 11 is a schematic diagram of the middle plate of the curved surface adjustment device according to an embodiment of the present invention.
Figure 12:
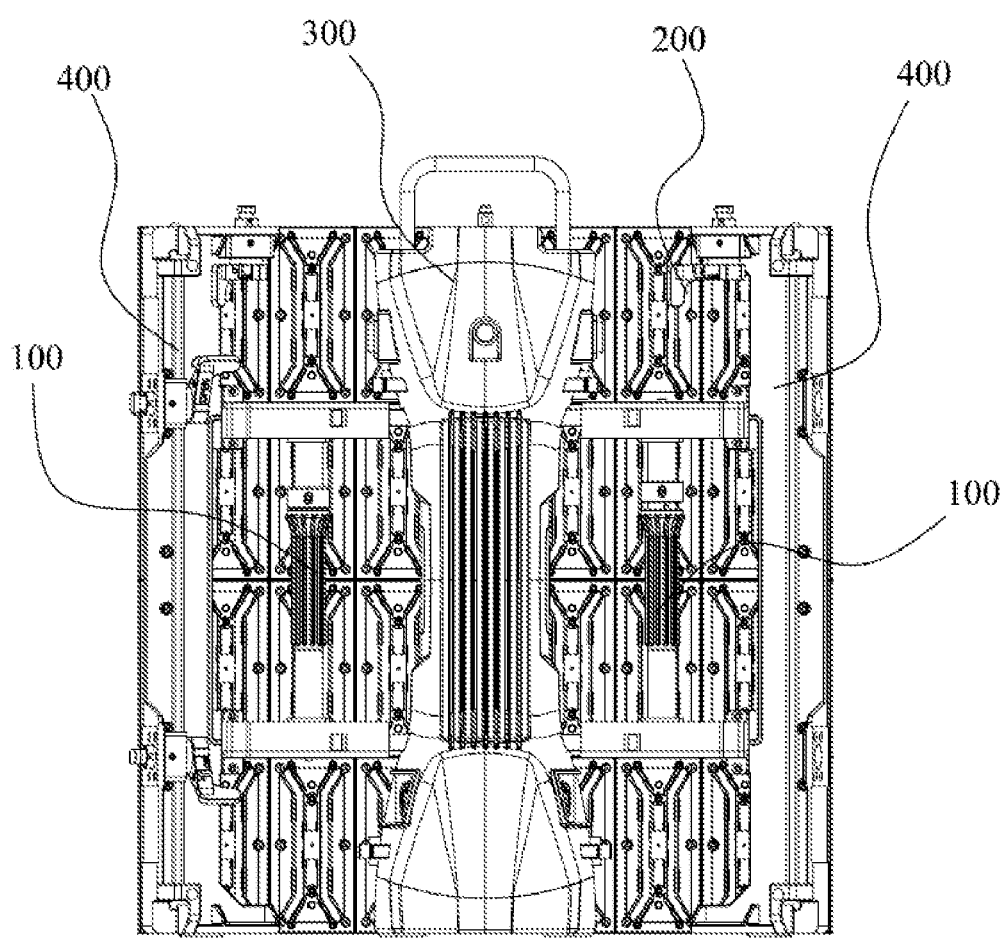
FIG. 12 is a schematic diagram of the LED display screen of an embodiment of the present invention.
Figure 13:
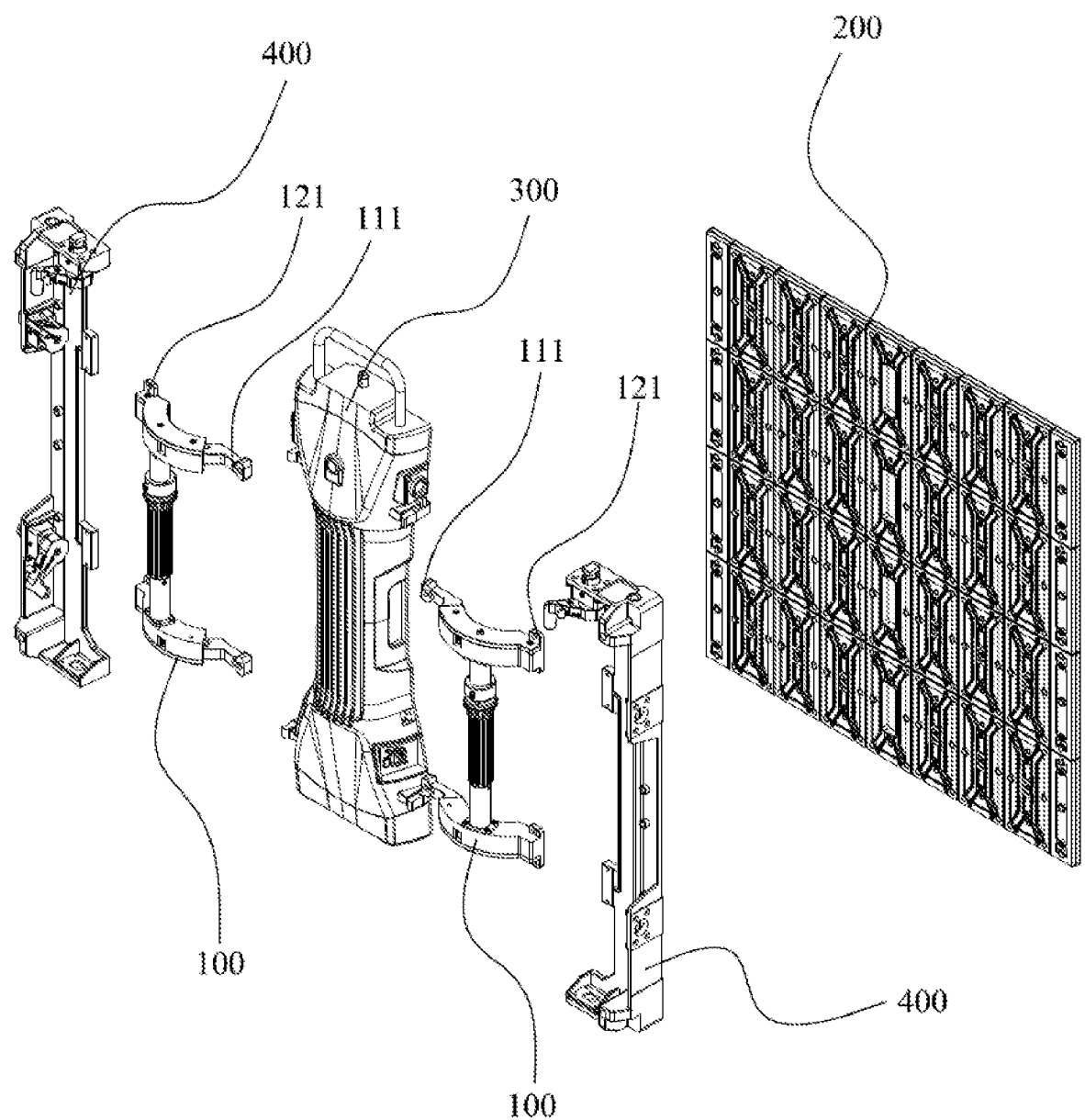
FIG. 13 is a exploded view of the LED display screen of an embodiment of the present invention.

In one embodiment, as shown in FIGS. 4 and 11, the locking piece 13 includes a locking plate 131 and a locking shaft 132 fixed on the locking plate 131, and the locking shaft 132 is provided with a positioning pin 133. The middle plate 11 is provided with a plurality of locking grooves 113 which can limit the positioning pin 133. When the thread component 21 is rotated, the top bar 22 slides along the through hole 231, making the positioning pin 133 locked in the corresponding locking groove 113, so that the arc-shaped sliding portion 112 is locked in the arc-shaped sliding groove 1231.

In one embodiment, as shown in FIGS. 3 and 4, the locking mechanism 2 further includes a spring 25 sleeved on the locking shaft 132 and supported between the locking plate 131 and the bottom plate 123.

When the locking mechanism 2 is in a locking state, the spring 25 is compressed between the locking plate 131 and the bottom plate 123. When the locking mechanism 2 is switched to an unlocking state, the elastic force of the spring 25 can provide a restoring force for the locking piece 13.

In one embodiment, as shown in FIG. 3, the thread component 21 includes a thread portion 211, a fixed portion 212, and a stop collar 213 located between the threaded portion 211 and the fixed portion 212. The thread portion 211 is threadedly connected in the thread hole 221 to realize a threaded connection between one end of the thread component 21 and the threaded hole 221.

An annular rotation slot 2131 is formed around the outer circumference of the stop collar 213. As shown in FIG. 2, the locking mechanism 2 further includes a detent 26, the detent passes through the bushing 23 and snaps into the rotation slot 2131, so as to limit the thread component 21 to only rotatably connecting in the through hole 231 of the bushing 23.

As shown in FIG. 2, the locking assembly further comprises a rotating rod 3, one end of the rotating rod 3 is fixedly connected with the fixed portion 212, and the thread component 21 can be rotated in the through hole 231 of the bushing 23 by rotating the rotating rod 3.

Specifically, one end of the rotating rod 3 may be provided with a clamping hole 32 matching the shape of the fixed portion 212, and the fixed portion 212 is clamped in the clamping hole 32 to realize a fixed connection between one end of the rotating rod 3 and the fixed portion 212. The cross section of the fixed portion 212 is not circular.

In one embodiment, as shown in FIGS. 2 and 3, the locking assembly further comprises a rotation stop ring 4, the rotation stop ring 4 is sleeved on the bushing 23, the inner sidewall of the rotation stop ring 4 is provided with a rotation stop slot 41, and one end of the rotation stop ring 4 is provided with a rotation stop hole (not shown). The bushing 23 is provided with a first rotation stop block 232, the first rotation stop block 232 is slidably connected in the rotation stop slot 41, and one end of the rotating rod 3 is provided with a second rotation stop block 31 corresponding to the position of the rotation stop hole.

The rotation stop ring 4 is provided with a rotation stop position and a rotatable position, and in the rotation stop position of the rotation stop ring 4, the second rotation stop block 31 is positioned in the rotation stop hole, to limit the relative rotation between the thread component 21 and the bushing 23. In the rotatable position of the rotation stop ring 4, the second rotation stop block 31 is away from the rotation stop hole, so that the thread component 21 can rotate relative to the bushing 23.

In one embodiment, as shown in FIGS. 1 to 11, the curved surface adjustment device 100 comprises two angle rotating assemblies 1, and the locking assembly comprises two locking mechanisms 2. The two angle rotating assemblies 1 are symmetrically arranged at both ends of the rotating rod 3, the two locking mechanisms 2 are symmetrically connected at both ends of the rotating rod 3 and are respectively positioned between the angle rotating assembly 1 and the rotating rod 3, and rotating the rotating rod 3 can make the two locking mechanisms 2 synchronously switch between locking state and unlocking state By controlling the rotating rod 3 located in the middle of the curved surface adjustment device 100, the two locking mechanisms 22 located at both ends of the rotating rod 3 are simultaneously switched from locking state to unlocking state, or simultaneously switched from unlocking state to locking state, so as to realize locking or unlocking of the arc-shaped sliding portion 112 of the two angle rotating assemblies 1 simultaneously.

The first mounting portions 121 of the two angle rotating assemblies 1 are fixedly connected to the box frame 400 in parallel. And the second mounting portions 111 of the two angle rotating assemblies 1 are fixedly connected to the power control box 300 in parallel, so that the curved surface adjustment device 100 can simultaneously adjust both ends of the LED module 200, making the curved surface of the LED display screen more smoother.

Figure 9:
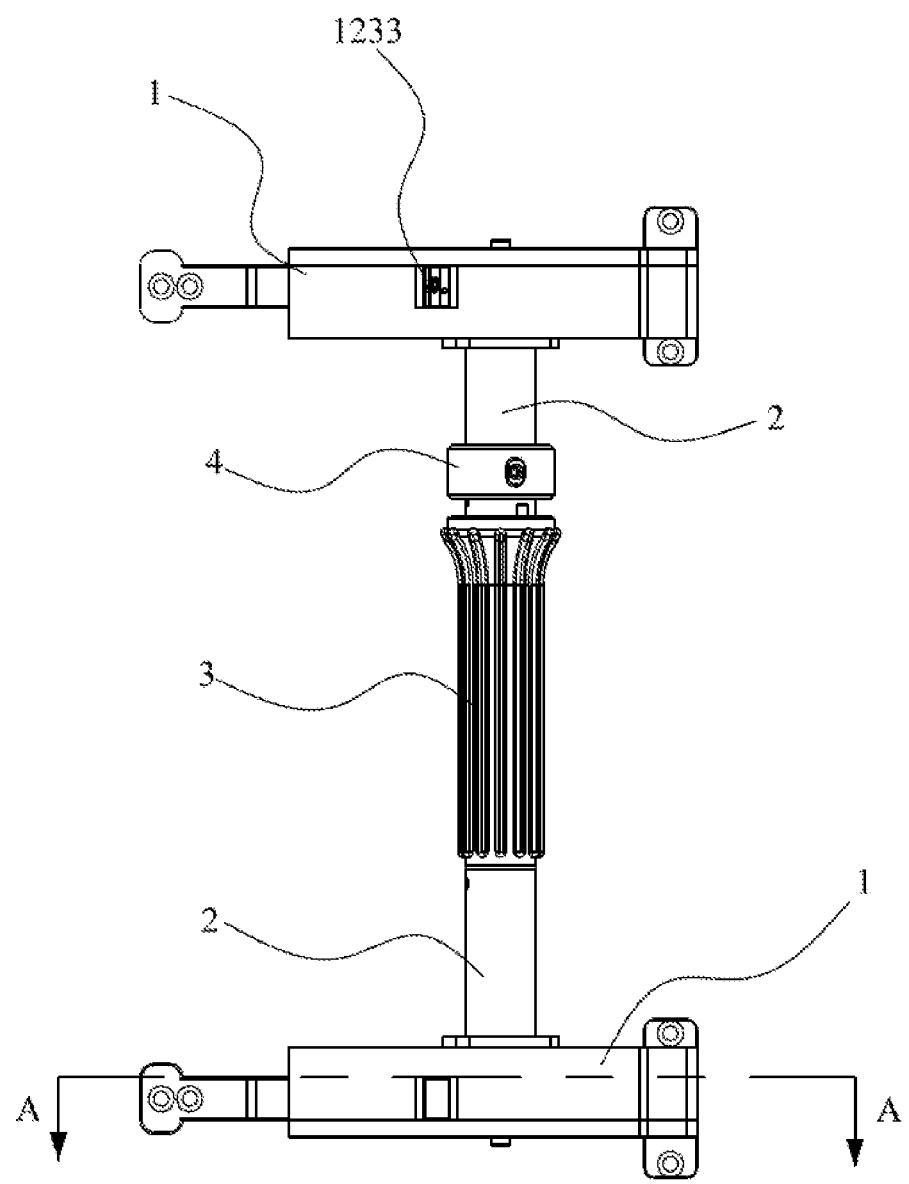
FIG. 9 is a front view of the curved surface adjustment device according to an embodiment of the present invention.
Figure 10:
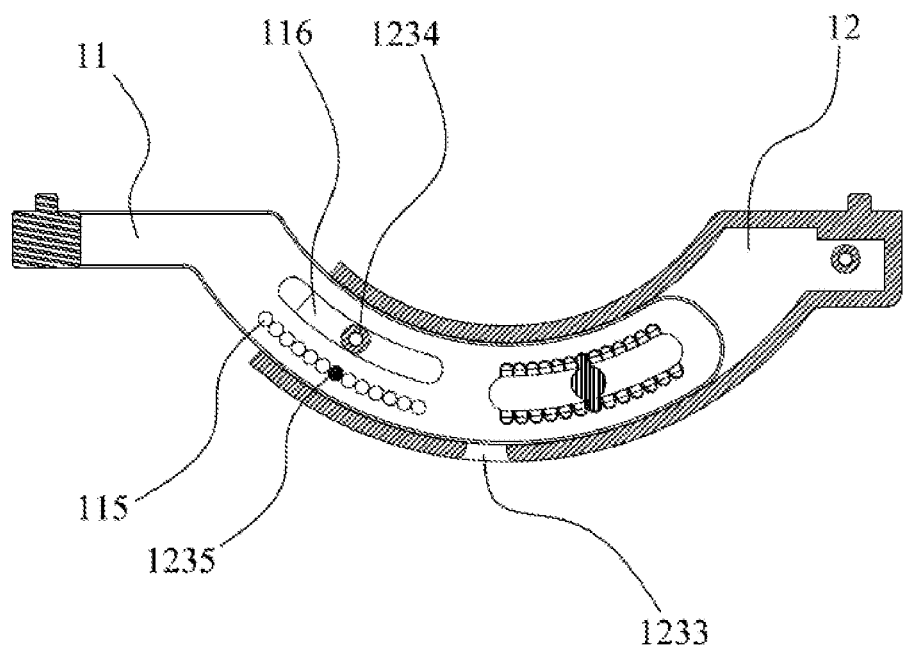
FIG. 10 is a sectional view of A-A of FIG. 9.

In one embodiment, as shown in FIGS. 9 to 11, the arc-shaped sliding portion 112 of the middle plate 11 is provided with an angle identification 114 and a marble slot 115, and the bottom plate 123 is provided with an identification hole 1233 corresponding to the angle identification 114. The bottom plate 123 is provided with a marble screw 1235 at the position corresponding to the marble slot 115. Preferably, the middle of a plurality of marble slots 115 is selected as the position of the marble screw 1235, which is the initial angle, with a scale of 0.

The angle identification 114 can conveniently and intuitively adjust the angle and limit. Preferably, the angle between the two adjacent compartments of the angle identification 114 is the same as the angle between the two adjacent locking grooves 113. In the embodiment shown in FIGS. 9 to 11, the included angle between two adjacent locking grooves 113 is 2.5°. The angle between two adjacent compartments of the angle identification 114 is also 2.5°. Specifically, angle identification 114 has 13 gears: −15°, −12.5°, −10°, −7.5°, −5°, −2.5°, 0°, 2.5°, 5°, 7.5°, 10°, 12.5°, 15°. It can be understood that for each locking groove 113 moved by the positioning pin 133, the angle between the middle plate 11 and the housing 12 can be adjusted to 2.5°, that is, the curved surface adjustment angle of the LED display screen is 2.5°. Through the angle identification 114, the operator can be clearly informed of the adjustment angle of the LED display screen.

In other embodiments, the included angle between two adjacent locking grooves 113 can be customized according to user requirements.

The marble slot 115 is located on the middle plate 11 provided with one side of the locking groove 113, and the marble screw 1235 is located in the marble slot 115. The marble screw 1235 is made of an extrudable elastic structure to improve hand feelings and reach a preliminary adjustment angle, and then locked by the locking mechanism 2.

In one embodiment, as shown in FIGS. 3 and 11, the middle plate 11 is provided with a guide arc hole 116, the bottom plate 123 is provided with a guide post 1234, the radians of the guide arc hole 116 and the arc-shaped sliding groove 1231 are the same and the centers of the circles coincide, and the guide post 1234 is positioned in the guide arc hole 116.

The guide post 1234 cooperates with the guide arc hole 116 to provide guidance for the sliding motion of the arc-shaped sliding portion 112 of the middle plate 11 in the arc-shaped sliding groove 1231 of the bottom plate 123.

The above descriptions are only preferred embodiments of the present invention and are not intended to limit the scope of the present invention. Any modifications, equivalent replacement and improvements made within the spirit and principles of the present invention shall be included within the scope of protection of the present invention. Further, unless otherwise required by context, singular terms shall include pluralities and plural terms shall include the singular. Thus, as used herein and in the claims, the singular forms include the plural reference and vice versa unless the context clearly indicates otherwise.

What is claimed is:

1. A curved surface adjustment device, comprising: an angle rotating assembly and a locking assembly, wherein the angle rotating assembly comprises a middle plate and a housing; the housing comprises a first mounting portion and a receptacle; an arc-shaped sliding groove is formed in the receptacle; the middle plate comprises a second mounting portion and an arc-shaped sliding portion; the second mounting portion is positioned outside the arc-shaped sliding groove; the arc-shaped sliding portion is positioned in arc-shaped sliding groove; and the first mounting portion and the second mounting portion are positioned at two sides of the arc-shaped sliding groove;

the locking assembly includes a locking mechanism having a locking state and an unlocking state, when the locking mechanism is in a locking state, the arc-shaped sliding portion is locked in the arc-shaped sliding groove, and when the locking mechanism is in an unlocking state, the arc-shaped sliding portion can slide relative to the arc-shaped sliding groove, so as to adjust the included angle between the first mounting portion and the second mounting portion.

2. The curved surface adjustment device according to claim 1, wherein the receptacle comprises a cover plate and a bottom plate, the arc-shaped sliding groove is arranged on the bottom plate, and the cover plate is fixedly connected to the bottom plate and covers the arc-shaped sliding groove.

3. The curved surface adjustment device according to claim 2, wherein the locking mechanism comprises a thread component, a top bar, a bushing and a locking piece, and the bushing is fixedly connected to the bottom plate; the bushing is provided with a through hole extending along the axial direction of the bushing, the bottom plate is provided with a locking hole axially penetrating the through hole, and the locking piece is positioned in the locking hole;

the top bar is slidably connected in the through hole, one end of the top bar is provided with a threaded hole, one end of the thread component is threadedly connected in the threaded hole, and the other end of the top bar is abutted against the locking piece; rotating the thread component can slide the top bar along the through hole, so that the locking piece locks the arc-shaped sliding portion.

4. The curved surface adjustment device according to claim 3, wherein the locking piece comprises a locking plate and a locking shaft fixed on the locking plate, the locking shaft is provided with a positioning pin, the middle plate is provided with a plurality of locking grooves which can limit the positioning pin, and rotating the thread component can make the positioning pin locked in the corresponding locking groove.

5. The curved surface adjustment device according to claim 4, wherein the locking mechanism further comprises a spring, and the spring is sleeved on the locking shaft and supported between the locking plate and the bottom plate.

6. The curved surface adjustment device according to claim 3, wherein the thread component comprises a thread portion, a fixed portion, and a stop collar located between the thread portion and the fixed portion; the thread portion is threadedly connected in the threaded hole, and an annular rotation slot is formed around the outer circumference of the stop collar;

the locking mechanism further includes a detent, the detent passes through the bushing and snaps into the rotation slot;

the locking assembly further comprises a rotating rod, one end of the rotating rod is fixedly connected with the fixed portion, and the thread component can be rotated by rotating the rotating rod.

7. The curved surface adjustment device according to claim 6, wherein the locking assembly further comprises a rotation stop ring, the rotation stop ring is sleeved on the bushing, the inner sidewall of the rotation stop ring is provided with a rotation stop slot, and one end of the rotation stop ring is provided with a rotation stop hole;

the bushing is provided with a first rotation stop block, the first rotation stop block is slidably connected in the rotation stop slot, and one end of the rotating rod is provided with a second rotation stop block corresponding to the position of the rotation stop hole;

the rotation stop ring is provided with a rotation stop position and a rotatable position, and in the rotation stop position of the rotation stop ring, the second rotation stop block is positioned in the rotation stop hole; in the rotatable position of the rotation stop ring, the second rotation stop block is away from the rotation stop hole.

8. The curved surface adjustment device according to claim 7, wherein the curved surface adjustment device comprises two angle rotating assemblies, and the locking assembly comprises two locking mechanisms; the two angle rotating assemblies are symmetrically arranged at both ends of the rotating rod, the two locking mechanisms are symmetrically connected at both ends of the rotating rod and are respectively positioned between the angle rotating assembly and the rotating rod, and rotating the rotating rod can make the two locking mechanisms synchronously switch between locking state and unlocking state.

9. The curved surface adjustment device according to claim 2, wherein the middle plate is provided with an angle identification and a marble slot, and the bottom plate is provided with an identification hole at a position corresponding to the angle identification.

10. The curved surface adjustment device according to claim 2, wherein the middle plate is provided with a guide arc hole, the bottom plate is provided with a guide post, the radians of the guide arc hole and the arc-shaped sliding groove are the same and the centers of the circles coincide, and the guide post is positioned in the guide arc hole.

11. An LED display screen, comprising an LED module, a power control box, a box frame and a curved surface adjustment device of claim 1, wherein the power control box is fixedly connected to the LED module, the box frame is fixedly connected to the edge of the LED module, the central axis of the power control box is parallel to the box frame, the first mounting portion is fixedly connected to the box frame, and the second mounting portion is fixedly connected to the power control box.

12. The LED display screen according to claim 11, wherein the LED display screen comprises two curved surface adjustment devices and two box frames, the power control box is positioned in the center of the LED module; the two box frames are symmetrically and fixedly connected at two sides of the power control box, and the two curved surface adjustment devices are symmetrically arranged on two sides of the power control box.

* * * * *